2,928,863
Patented Mar. 15, 1960

2,928,863

THIOPHOSPHORIC ACID ESTERS AND THEIR PRODUCTION

Gerhard Schrader, Opladen, Germany, assignor to Farbenfabriken Bayer Aktiengesellschaft, Leverkusen, Germany, a corporation of Germany No Drawing. Application August 24, 1956
Serial No. 605,959

Claims priority, application Germany September 3, 1955

5 Claims. (Cl. 260—461)

This invention relates to thiophosphoric acid esters of the general formula

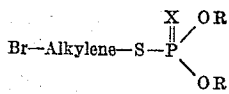

wherein R stands for alkyl or aryl radicals and X stands for O or S.

Thiophosphoric acid esters have become more and more important in the field of insecticides, acaricides, miticides etc. during the last years. Thus, it is the principal object of the present invention to provide a new class of phosphoric acid esters, suitable as pesticides or as intermediates for the production of other pesticides. Another object is the preparation of these phosphoric acid esters; still further objects will become apparent as the following description proceeds.

In accordance with this invention it has been found that 1,2-dibromo-lower alkanes react with di-esters of thiol- or thiono-thiol-phosphoric acids to yield the corresponding β-bromo lower alkyl-thiol- (or-thiono-thiol)-phosphoric acid esters. This reaction may be typically shown by the following equation,

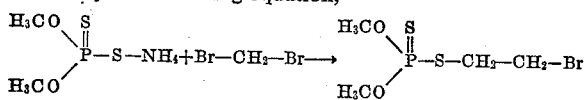

using the ammonium salt of O,O-dimethyl-dithio-phosphoric acid and 1,2-dibromo-ethane as reaction components. It is to be understood, however, that instead of these reactants also other phosphoric acid esters or their salts and other dibromo-alkanes, may be used. Suitable phosphoric acid esters are the di-lower alkyl esters, such as dimethyl-, diethyl-, dipropyl-, dibutyl-, diamyl etc. Also suitable are the diphenyl, di-cyclohexyl or -dibenzyl-thiol-phosphoric-acid-esters or the corresponding thiol-thiono-phosphoric-acid-esters. Instead of the above mentioned ammonium salt other salts, such as the sodium, potassium or substituted ammonium salts may be used. Instead of 1,2-dibromo-ethane also the corresponding substituted propanes, butanes, pentanes etc. having their halo substituents on adjacent carbon atom may be used for this inventive reaction.

Thus, the products of the present invention may be represented by the following general formula:

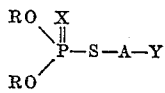

In this formula R stands for alkyl or aryl radicals, X is O or S, A means an ethylene chain and Y may be bromine.

The process of the invention is preferably carried out in an inert solvent. If thionothiol phosphoric acid esters are prepared starting from dibromoalkanes, the reaction generally should be carried out in aqueous solution. Either the salts of the corresponding thiono-thiol-phosphoric-acids may be dissolved and these reacted with the dibromoalkanes, or on the other hand the free acids may be dissolved in water at first and then neutralized with alkali before reacting with the dihalo-alkanes. An excess of alkali generally does not adversely affect the reaction. Where thiol-phosphoric-acid-bromoalkyl-esters are prepared, better results are obtained by carrying out the reaction in inert organic solvents with the exclusion of water. Suitable organic solvents are e.g. benzene, toluene, xylene, ethyl ether, ketones etc., especially suitable are ketones such as acetone or methyl-ethylketone.

The reaction generally proceeds at temperatures from about 0° C. to about 200° C., temperatures from about 50° to about 100° C., however, are preferred; for completeness of the reaction the compounds should be allowed to react over a period of several hours, the reaction time depending on the temperature and solvent used.

The new phosphoric acid esters exhibit remarkable insecticidal properties against e.g. aphids, flies, mites, lice etc. Generally they may be applied in concentrations from about 0.001% to about 1%, diluted with suitable solid carriers such as talc, chalk, bentonite, clay or liquid carriers, such as water, organic solvents etc. Aerosols may also be utilized in the generally known manner, the preferred method of application is to dust or spray such compositions on suitable objects or on plants. Furthermore, in view of the halogenalkyl-residue, the inventive compounds are valuable intermediates for the production of other insecticidal phosphoric-acid esters.

The invention may be illustrated by the following examples without, however, being restricted thereto.

Example I

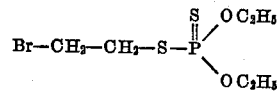

60 g. dithiophosphoric-acid-diethyl ester are dissolved in 50 ccm. water containing 17 g. potassium hydroxide. 60 g. dibromoethane are added slowly at 80° C. After the addition has been completed the reaction mixture is allowed to stand for further 2 hours at 80° C. After cooling 100 ccm. chloroform are added and the two layers are separated. The organic layer is washed twice with 20 ccm. of water, dried over sodium sulfate and at last the chloroform is distilled off. The remaining O,O-diethyl-S-(2-bromo-ethyl-) dithiophosphoric acid (60 g.) distills at 0.01 mm. Hg at 60° C. It is a colorless oil and only slightly soluble in water.

Example II

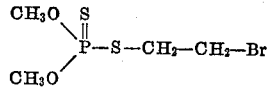

55 g. dithiophosphoric-acid-dimethyl ester are dissolved in 50 ccm. water containing 17 g. potassium hydroxide, 60 g. dibromoethane are added at 90° C. and the reaction mixture is allowed to stand for one further hour after the addition has been completed at this temperature. The following procedure may be carried out in accordance with Example I, the yield of O,O-dimethyl-S-(2-bromoethyl-)dithiophosphoric-acid amounts to 55 g. The new ester distills at 0.01 mm. Hg at 55° C. and is a colorless and only slightly watersoluble oil.

Example III

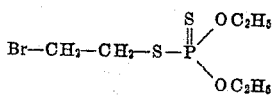

150 g. of the ammonium salt of thiol-phosphoric-acid-O,O-diethyl ester are dissolved in 600 ccm. of methylethyl-ketone. A mixture of 304 g. dibromoethane and 300 ccm. methylethylketone are added slowly at 75° C. This temperature is maintained for further 4 hours for the completeness of the reaction. After cooling the precipitated salts are removed by filtering off. The methylethyl-ketone is then distilled off and the oily residue is taken up in 500 ccm. of ether. The etheral solution is washed 3 times with 20 ccm. of water, dried over sodium sulfate and at last the ether is removed by distillation. There are obtained 210 g. of O,O-diethyl-S-(2-bromoethyl) thiol-phosphoric-acid boiling at 0.02 mm. Hg at 75° C.

I claim:

1. A compound of the general formula

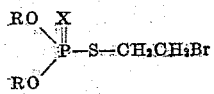

wherein R stands for a member selected from the group consisting of lower alkyl and phenyl radicals, X stands for a member selected from the group consisting of oxygen and sulfur.

2. A compound of the formula

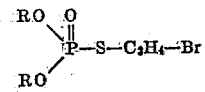

wherein R stands for a member selected from the group consisting of lower alkyl and phenyl radicals.

3. A compound of the formula

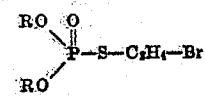

wherein R stands for a member selected from the group consisting of lower alkyl and phenyl radicals.

4.

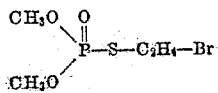

5.

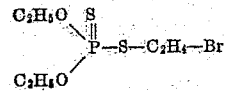

References Cited in the file of this patent

UNITED STATES PATENTS

| | | |
|---|---|---|
| 1,955,207 | Stotter et al. | Apr. 17, 1934 |
| 2,266,514 | Romieux et al. | Dec. 16, 1941 |
| 2,611,728 | Bartlett et al. | Sept. 23, 1952 |
| 2,736,726 | Gaetzi et al. | Feb. 28, 1956 |
| 2,744,128 | Morris et al. | May 1, 1956 |
| 2,767,206 | Whetstone et al. | Oct. 16, 1956 |
| 2,789,124 | Gilbert et al. | Apr. 16, 1957 |

FOREIGN PATENTS

| | | |
|---|---|---|
| 701,794 | Great Britain | Jan. 6, 1954 |

OTHER REFERENCES

Schrader: "Die Entwicklung Never Insektizide auf Grundlage Organischer Fluorund Phosphorverbindungen" (1952), p. 67.

UNITED STATES PATENT OFFICE
CERTIFICATE OF CORRECTION

Patent No. 2,928,863　　　　　　　　　　　　　　　March 15, 1960

Gerhard Schrader

It is hereby certified that error appears in the printed specification of the above numbered patent requiring correction and that the said Letters Patent should read as corrected below.

Column 1, lines 39 to 41, the left-hand portion of the equation should appear as shown below instead of as in the patent:

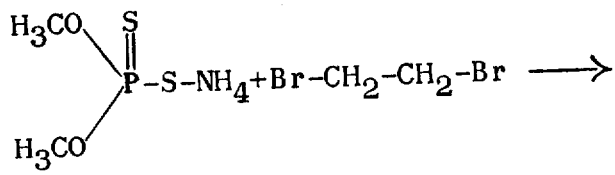

column 2, lines 66 to 70, Example III, the formula should appear as shown below instead of as in the patent:

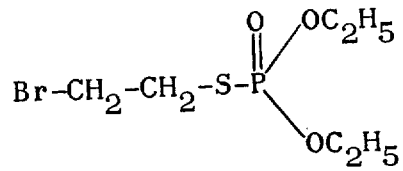

column 3, lines 31 to 33, claim 3, the formula should appear as shown below instead of as in the patent:

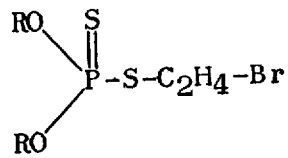

column 4, line 28, list of References Cited, under OTHER REFERENCES, for "Never" read -- Neuer --.

Signed and sealed this 11th day of October 1960.

(SEAL)
Attest:

KARL H. AXLINE
Attesting Officer

ROBERT C. WATSON
Commissioner of Patents